No. 728,758. PATENTED MAY 19, 1903.
A. PILLER.
LAND AND WATER VEHICLE.
APPLICATION FILED APR. 29, 1902.
NO MODEL. 3 SHEETS—SHEET 3.
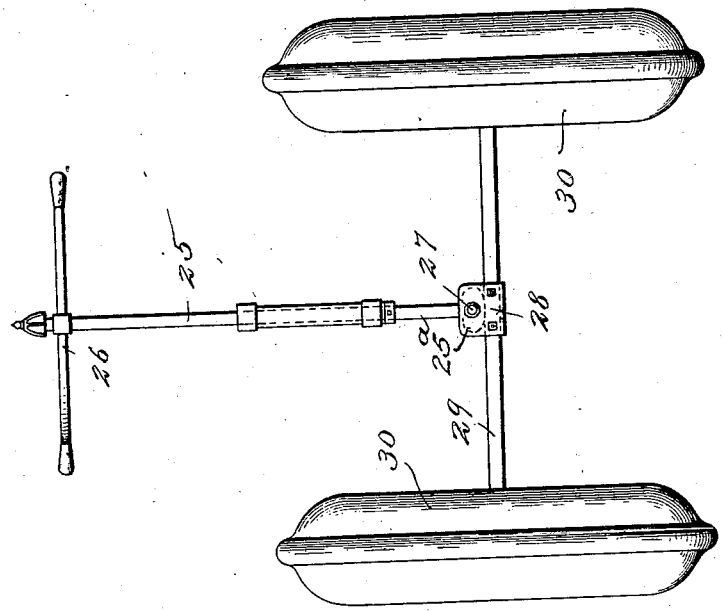
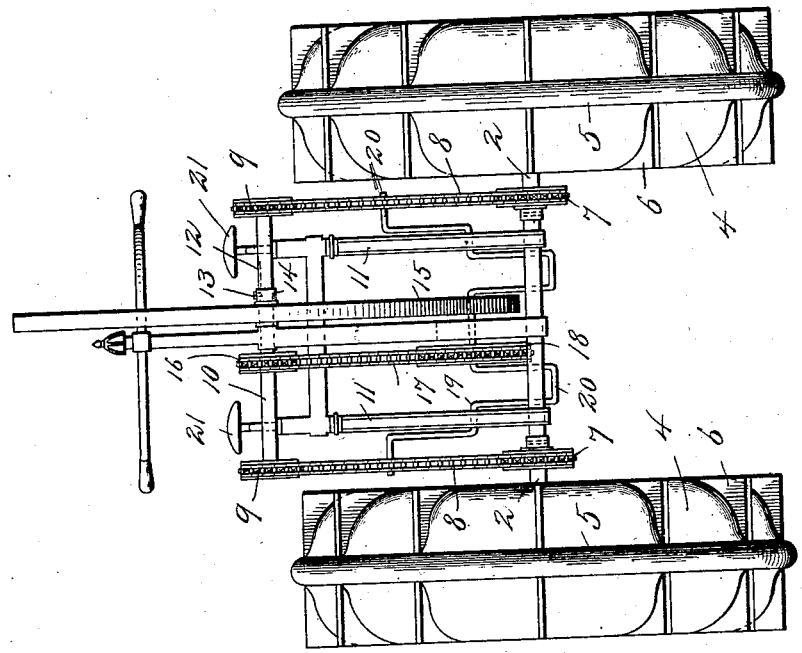
Witnesses
Harry L. Ames.
Chas. S. Hyer.
Inventor
Anton Piller.
By Victor J. Evans
Attorney No. 728,758. Patented May 19, 1903.

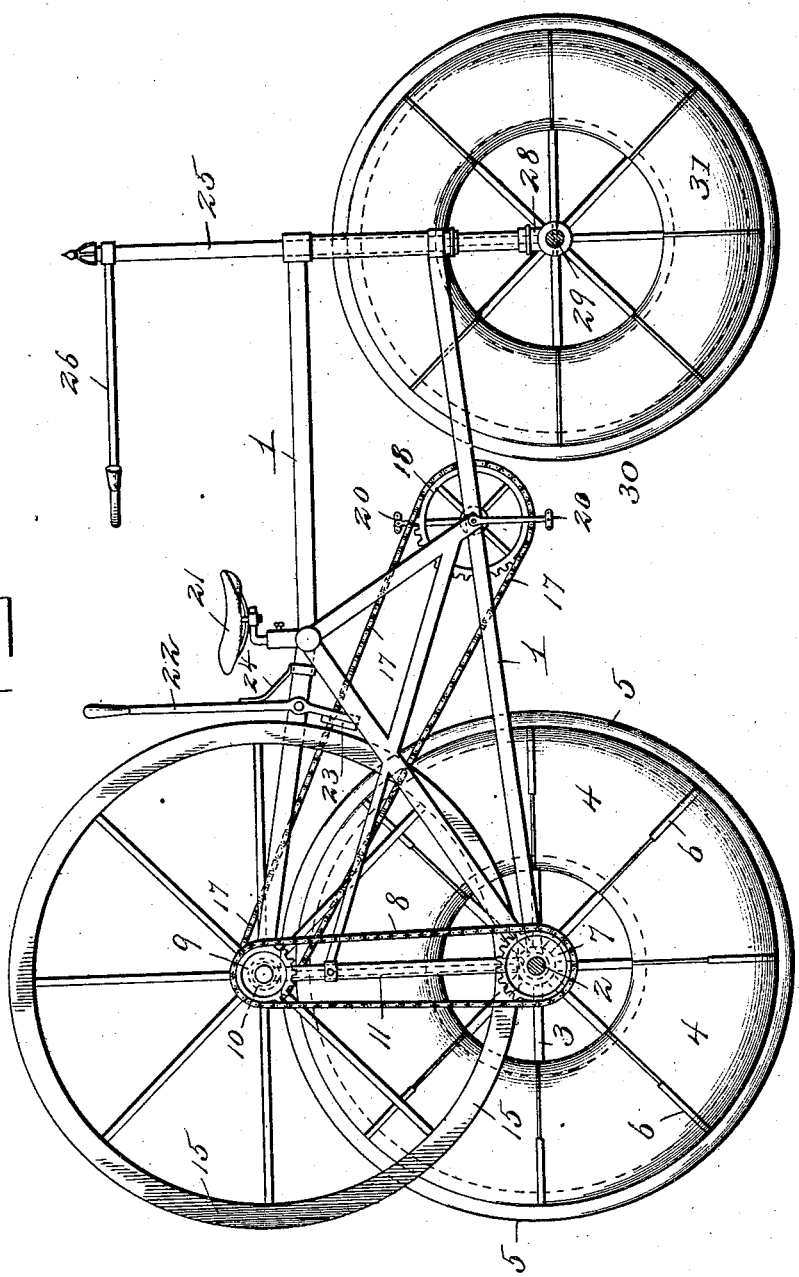

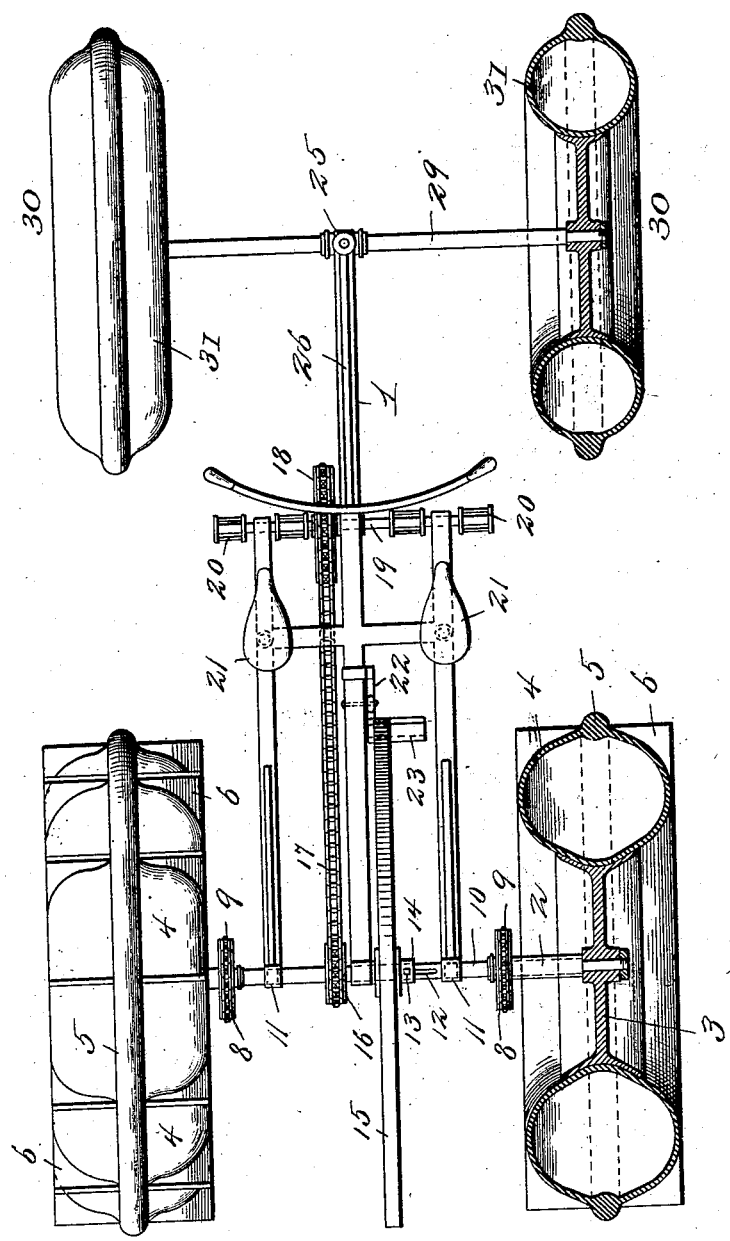

UNITED STATES PATENT OFFICE.

ANTON PILLER, OF TRENTON, NEW JERSEY.

LAND AND WATER VEHICLE.

SPECIFICATION forming part of Letters Patent No. 728,758, dated May 19, 1903.

Application filed April 29, 1902. Serial No. 105,223. (No model.)

*To all whom it may concern:*

Be it known that I, ANTON PILLER, a citizen of the United States, residing at Trenton, in the county of Mercer and State of New Jersey, have invented new and useful Improvements in Land and Water Vehicles, of which the following is a specification.

My invention relates to new and useful improvements in land and water vehicles for use upon land and water; and its object is to employ a vehicle mounted upon tires adapted to serve as floats when placed in a body of water and support the frame of the vehicle above the surface of the water.

Another object is to so construct a desired number of the tires as to adapt it for use as a paddle or propeller for driving the vehicle forward in the water, said tires, however, requiring no alteration when used as ordinary road-tires.

Another object is to so mount the steering-wheels as to prevent undue lateral dipping of the device.

With the above and other objects in view the invention consists in mounting a frame upon a driven shaft, to which are secured wheels having combined tires and paddles thereon. A fly-wheel is keyed to a shaft adapted to be revolved at a high speed by suitable motive power and to transmit said power to the shaft of the wheels. The front wheels of the vehicle are mounted on an axle, which is connected to a revoluble steering-head journaled in the frame of the machine and adapted to be operated in any suitable manner. This axle is pivoted to the steering-head in such a manner as to permit the wheels to swing vertically to accord with any unevenness of the ground or the surface of the water.

The invention also consists in the further novel construction and combination of parts hereinafter more fully described and claimed, and illustrated in the accompanying drawings, showing one form of my invention, and in which—

Figure 1 is a side elevation. Fig. 2 is a plan view showing the wheels on one side and their tires in section. Fig. 3 is a rear elevation, and Fig. 4 is a front elevation, of the steering-gear.

Referring to the figures by numerals of reference, 1 is a frame of any desired form and which is supported at the rear end upon an axle 2, to which are secured wheels 3. Each of these wheels is provided with a large pneumatic tire 4, the two being of sufficient capacity to float the rear portion of the vehicle. A bead or tread 5 is formed around these tires, and extending from the periphery of each tire and at each side of the tread are a suitable number of angular blades or paddles 6. A sprocket 7 is secured to axle 2 near each wheel 3, and these are engaged by chains 8, passing over sprockets 9, secured at the ends of a shaft 10, journaled on standards 11, mounted on the frame. The shaft 10 is grooved longitudinally, as at 12, and receives a pin or key 13, extending into the hub 14 of a fly-wheel 15. A sprocket 16 is secured to this shaft and a chain 17 is mounted thereon and driven by a suitable motor. In the drawings I have shown this chain mounted on a drive-sprocket 18, secured to a crank-shaft 19, provided with pedals 20. The vehicle can thus be propelled by foot-power. If desired, however, any desired form of motor may be substituted for the crank-shaft 19. Seats 21 may be provided at desired points upon the frame, and a brake-lever 22 is preferably located adjacent thereto. This lever is fulcrumed to one of the bars of the frame 1 and is provided with a brake-shoe 23, adapted to be pressed into contact with the periphery of fly-wheel 15 and which is equal in length to the groove 12, so that it can be applied to said wheel no matter where it may be upon shaft 10. A spring 24 serves to hold the brake normally removed from the fly-wheel. A steering-lever 25 is journaled in the forward end of the frame 1 and is provided with an operating-handle 26. The lower end of the lever 25 terminates in an oval head 25ª and is mounted on a horizontal pivot 27, fastened within a bracket 28. This bracket is secured to the center of an axle 29, at the ends of which are mounted wheels 30, having pneumatic tires 31 thereon of sufficient capacity to support the front of the frame 1. These tires are similar to those upon the propelling-wheels, excepting the blades 6, which are not employed. The sprockets and chains are so geared as to impart a very rapid revolution to the fly-wheel 15.

By mounting the front wheels upon a vertically-swinging shaft they are permitted to rock up and down to conform to the unevenness of the surface over which they are traveling. By providing a tread 5, which extends beyond the blades 6, it is unnecessary to make any change in the tire when it is used upon land.

In the foregoing description I have shown the preferred form of my invention; but I do not limit myself thereto, as I am aware that modifications may be made therein without departing from the spirit of the invention, and I reserve the right to make such changes as fall within the scope of the invention.

Having thus fully described the invention, what is claimed as new is—

1. In a vehicle of the character described, the combination with a frame, of propelling-wheels journaled thereon, means for imparting motion to the wheels, of a steering-lever provided with an oval head, a bracket attached to the axle and adapted to be pivotally secured to the head, whereby the axle is adapted to swing in a vertical plane, and steering-wheels carried by the axle having a segmental head fixed thereto, of pivoted brackets secured to the head having steering-wheels thereon, an axle retained in said brackets and adapted to swing in a vertical plane.

2. The combination with a frame provided with vertical standards, of an axle journaled thereon, propelling-wheels mounted upon the axle, a shaft journaled upon the standards, a fly-wheel keyed to the shaft, means for imparting motion to the shaft, means for connecting the shaft and axle to have motion imparted thereto, a steering-lever, an axle pivoted thereto and adapted to swing in a vertical plane, and steering-wheels mounted upon the last-named axle.

In testimony whereof I affix my signature in presence of two witnesses.

ANTON PILLER.

Witnesses:
   TOBIAS RICKER,
   JOHN P. GELLIKE.